United States Patent [19]

Semon

[11] 4,377,182

[45] Mar. 22, 1983

[54] THREE-WAY VALVE

[76] Inventor: Albert L. Semon, 11 Eliot Pl., Short Hills, N.J. 07078

[21] Appl. No.: 265,544

[22] Filed: May 20, 1981

[51] Int. Cl.³ .......................................... F16K 31/524
[52] U.S. Cl. .................................. 137/596.1; 251/256
[58] Field of Search ............... 251/256, 255, 254, 253; 74/99 R, 99 A; 137/596.1

[56] References Cited

U.S. PATENT DOCUMENTS

| 340,329 | 4/1886 | Leach | 251/256 X |
|---|---|---|---|
| 1,156,010 | 10/1915 | Kenney | 251/256 X |
| 2,606,739 | 8/1952 | Gardner | 137/596.1 |
| 3,164,173 | 1/1965 | Semon | 251/254 X |
| 3,288,431 | 11/1966 | Inagawa | 251/256 X |

Primary Examiner—Alan Cohan
Attorney, Agent, or Firm—John N. Bain; P. H. Kochanski

[57] ABSTRACT

There is disclosed in an improved three-way valve with an improved valve engagement assembly comprised of first ball members mounted on a valve shaft and second ball members mounted on a control shaft whereby rotation of the control shaft causes the first ball members to contact the second ball members to move a valve assembly from a first position to a second position.

9 Claims, 8 Drawing Figures

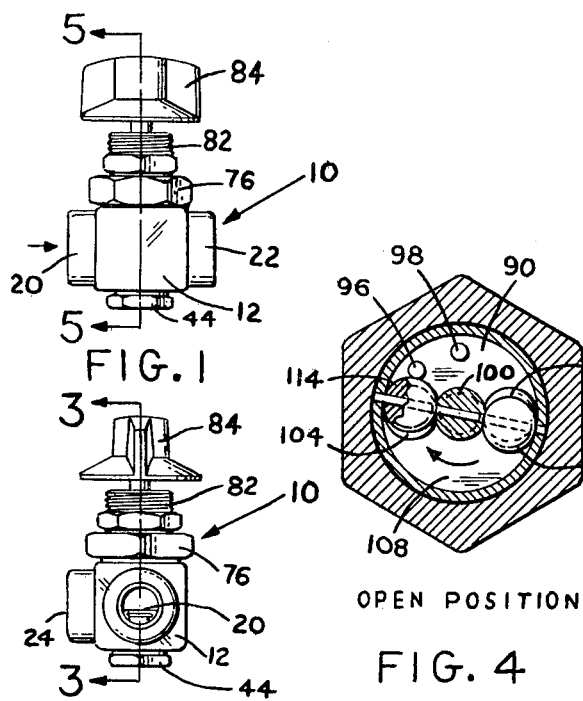
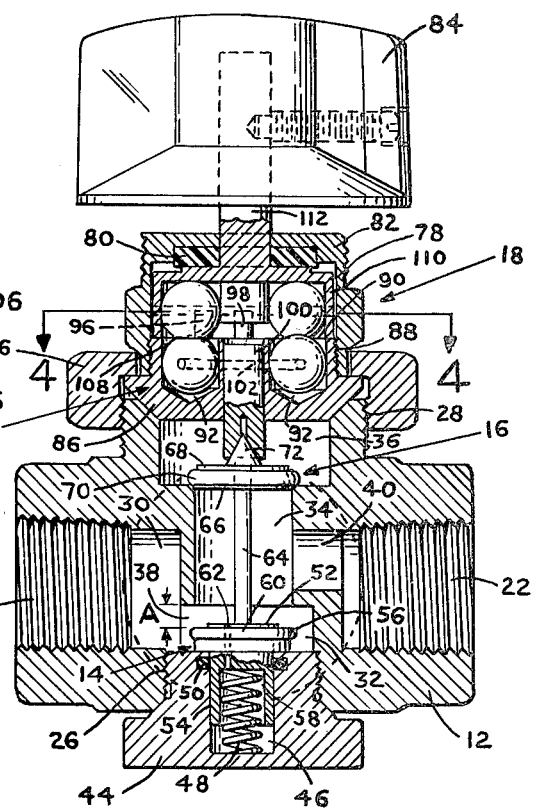
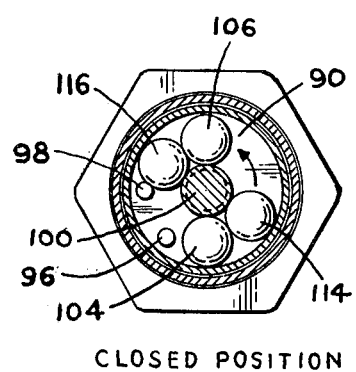
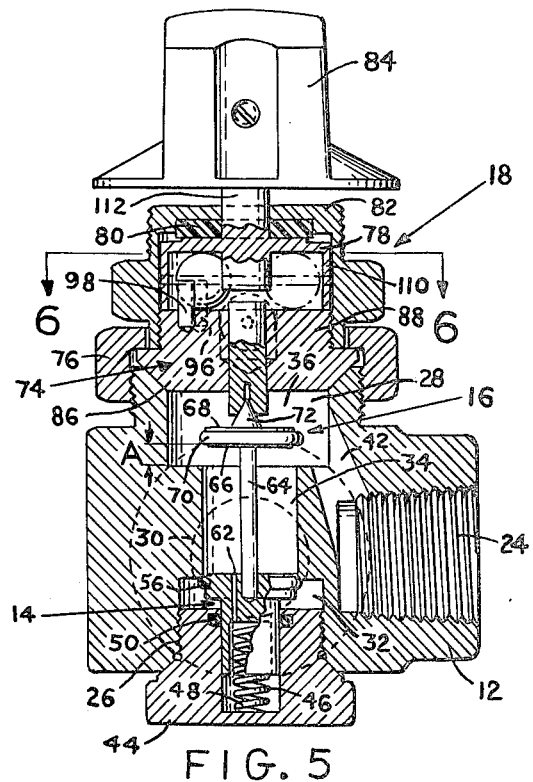

THREE-WAY VALVE

FIELD OF THE INVENTION

This invention relates to a valve, and particularly to an improved three-way valve.

BACKGROUND OF THE INVENTION

In U.S. Pat. No. 1,272,867 to Schulder, there is disclosed a faucet which involves the use of rollers and a rotatable handle to effect uplift of a separate valve stem undulating surfaces without rotation of the stem or uplift of the handle relative to the body. This is achieved by the use of rollers which are adapted to ride upon an annular undulating track.

In U.S. Pat. No. 3,164,173 to Semon, there is disclosed an improvement on the use of rollers on cam surfaces such as projections, such as balls, which are secured in the valve casing, wherein the rollers ride on and off the cam surfaces.

Neither of the beforementioned apparatus alleviate the problem of friction wear between either, as described in Schulder, a roller and an undulating surface or, as described in Semon, a roller and a base. Further, this leads to periodic disassemblement of the valve for lubricating purposes.

OBJECTS OF THE INVENTION

It is an object of the present invention to provide a novel three-way valve.

Another object of the present invention is to provide a novel three-way valve which requires no lubrication.

Yet another object of the present invention is to provide a novel three-way valve where there is no grinding action due to friction.

A further object of the present invention is to provide a three-way valve that requires no upward or downward movement of the munipulating handle.

Yet another object of the present invention is to provide a novel three-way valve that requires one-sixth of a turn to open and close.

Still another object of the present invention is to provide a novel three-way valve where the exhaust port is as large as the other ports.

SUMMARY OF THE INVENTION

These and other objects of this invention are achieved by an improved three-way valve with an improved valve engagement assembly comprised of first ball members mounted on a valve shaft and second ball members mounted on a control shaft whereby rotation of the control shaft causes the first ball members to contact the second ball members to move a valve assembly from a first position to a second position.

BRIEF DESCRIPTION OF THE DRAWINGS

A better understanding of the present invention as well as other objects and advantages thereof, will become apparent upon consideration of the detailed disclosure thereof, especially when taken with the accompanying drawings, wherein:

FIG. 1 is a rear-elevational view of the present invention;

FIG. 2 is a side elevational view of the present invention;

FIG. 3 is a vertical-sectional view of the present invention in an open position taken on the line through 3—3 in FIG. 2 looking in the direction of the arrows;

FIG. 4 is a cross-sectional view taken on the line 4—4 of FIG. 3 looking in the direction of the arrows showing the present invention in the open position;

FIG. 5 is a vertical sectional view of the present invention in a closed position taken on the line 5—5 in FIG. 1 looking in the direction of the arrows;

FIG. 6 is a cross-sectional view taken on the line 6—6 of FIG. 5 looking in the direction of the arrows showing the present invention in the closed position;

DETAILED DESCRIPTION OF THE INVENTION

Figures 7, 8:
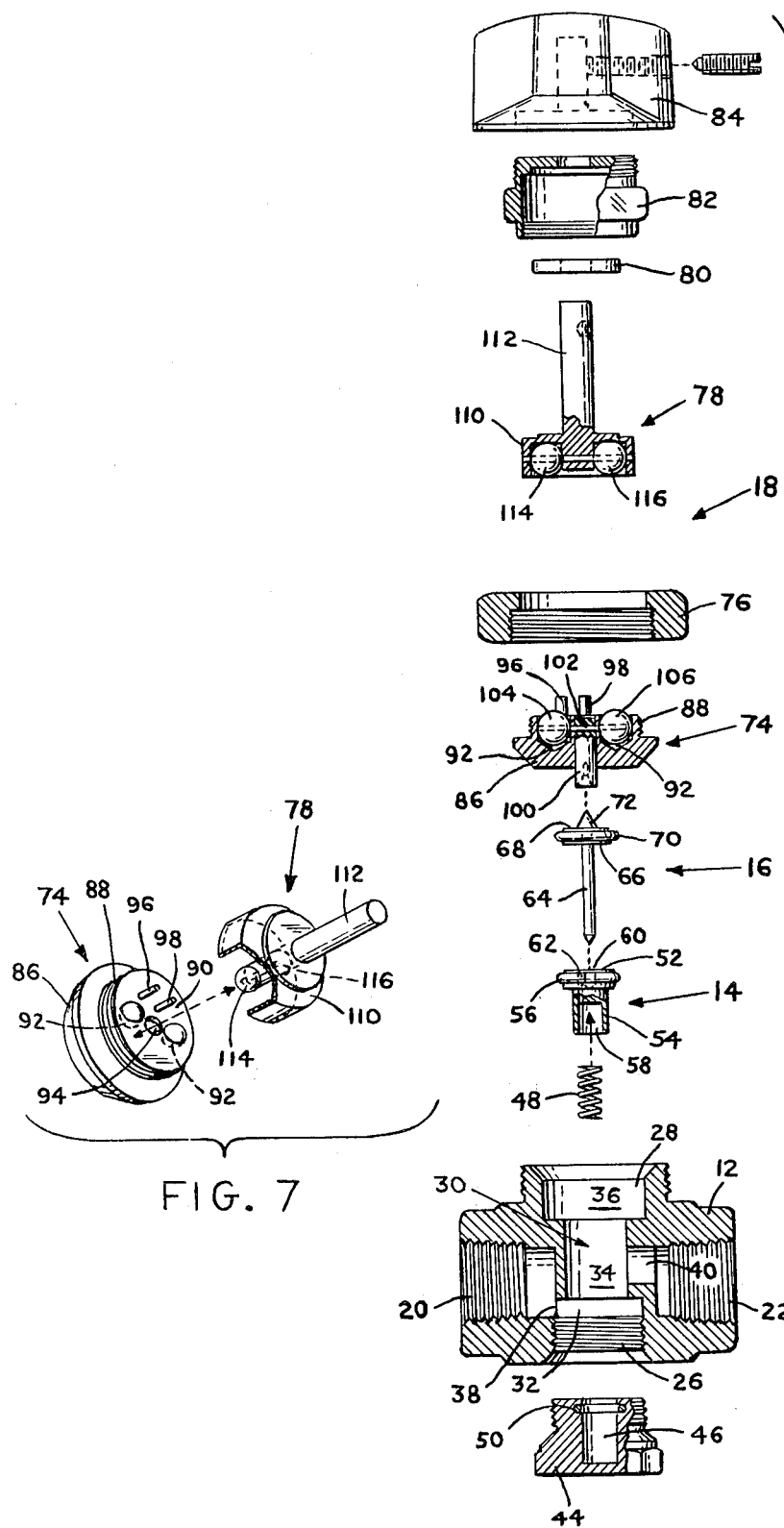
FIG. 7 is an exploded view of the valve opening-closing mechanism of the present invention.
FIG. 8 is an exploded view of the present invention.

Referring now to FIGS. 1 and 2, there is shown in different prospectives a novel three-way valve assembly, generally indicated as 10.

A shown in more detail in FIGS. 3, 5, 7 and 8, the three-way valve assembly is comprised of a pipe coupling housing, generally indicated as 12, a main valve assembly, generally indicated as 14, an exhaust valve assembly, generally indicated as 16 and a valve engagement assembly, generally indicated as 18.

The pipe coupling housing 12 is formed with an internal screw threaded inlet port 20, an internal screw threaded outlet port 22 and an internal screw threaded exhaust port 24. Additionally, pipe coupling housing 12 is provided with an internal screw threaded bottom orifice 26 and an external screw threaded top orifice 28. The pipe coupling housing 12 is further formed with chambers, generally indicated as 30, the lowermost chamber on entrance chamber 32, the intermediate chamber or transfer chamber 34, and the uppermost chamber or exhaust chamber 36. The three chambers 32, 34 and 36 respectively, are never all in direct fluid communication with each other during operation; entrance chamber 32 and transfer chamber 34 are in fluid communication as shown in FIG. 3, when main valve assembly 14 is open and exhaust valve assembly 16 is closed; the exhaust chamber 36 is in fluid communication with transfer chamber 34, when main valve assembly 14 is closed and exhaust valve assembly 16 is open.

The inlet port 20 is in fluid communication with the entrance chamber 32 through inlet passageway 38; the outlet port 22 is in fluid communication with the transfer chamber 34 through outlet passageway 40; the exhaust port 24 is in fluid communication with the exhaust chamber 36 through exhaust passageway 42.

Threadably engaged with the internal screw threaded bottom orifice 28 is a plug 44. The plug 44 is provided with a centrally located piston chamber 46 wherein is situate a spring 48. Surrounding the upper portion of piston chamber 46 is an o-ring 50.

The main valve assembly 14, as shown in FIGS. 3 and 8, is formed by an upper plate portion 52 and a bottom piston portion 54 with a sealing o-ring 56 spun in between the upper and bottom portions, 52 and 54 respectively. The bottom piston portion 54 is further provided with a chamber 58. The upper plate portion 52 is further provided with an orifice 60 and a balance or vent port 62, which connects the upper portion 52 with chamber 58. As shown in FIG. 3, main valve assembly 14 is slidably mounted in piston chamber 46 on top of spring 48, and when mounted, thereby causing said main valve assembly to be spring loaded, chamber 58 of main valve assembly 14 partially incapsulates spring 48, thereby providing for support and movement of main valve assembly 14, o-ring 50 seals the piston chamber 46 and works in conjunction with balance or vent port 62 to equalize the pressure and keep the valve in balance.

As shown in FIG. 5, cooperatively positioned upon main valve assembly 14 is exhaust valve assembly 16, which separates transfer chamber 34 from exhaust chamber 36. Exhaust valve assembly 16 is formed by a stem portion 64, a bottom plate portion 66, a top plate portion 68, a sealing o-ring 70 spun inbetween top plate portion 68 and bottom plate portion 66 and a conical top member 72 centrally located on top plate portion 68. Stem portion 64 is positioned on main valve assembly 14 in orifice 60, and traverses the entire transfer chamber 34.

Referring now to FIGS. 2, 7 and 8, valve engagement assembly 18 is comprised of a cap member, generally indicated as 74, a locking nut 76 which clamps the cap member 74 to the external screw threaded top orifice 28 of the pipe coupling housing 12, a handle receiving support member, generally indicated as 78, a teflon washer 80, a locking cap member 82 and a manipulating handle 84. Cap member 74 is formed with a lower angular portion 86, which when fitted upon the external screw threaded top orifice 28 of the pipe coupling housing 12 cooperatively forms the exhaust chamber 36. Additionally, cap member 74 is formed with an upper threaded portion 88 and a top plate portion 90. The top plate portion 90 is provided with a pair of recesses, generally indicated as 92. Recesses 92 are diametrically opposite each other. The top plate portion 90 is also provided with a central bore 94 and a pair of abutment pins 96 and 98 respectively. Slidably mounted within the central bore 94 is valve shaft 100, which has affixed to it by a pin 102 two balls, 104 and 106 respectively, diametrically opposite each other. Balls 104 and 106 are seated within the recesses 92. The valve shaft 100 protrudes through the lower angular portion to sit upon the conical top member 72 of the exhaust valve assembly 16.

Mounted above cap member 74 is handle receiving support member 78, together they cooperately form a control chamber 108. The handle receiving support member 78 is formed by a cover portion 110 and a control shaft 112, which starts within cavity 108 and rises through cover portion 110 terminating within the manipulating handle 84. The portion of the control shaft 112 within cavity 108 has affixed to it a pair of rotatable balls 114 and 116 respectively. Balls 114 and 116 are diametrically opposite each other and are positioned in cavity 108 as depicted in FIG. 4 or FIG. 6.

Handle receiving support member 78 is fastened to the remainder of the valve assembly 10 by locking cap member 82, which is threadably engaged to the upper threaded portion 88 of cap member 74. A teflon washer 80 is inserted between cover portion 110 and locking cap member 82 to prevent metal to metal contact, thereby avoiding friction and grinding.

Referring now to FIGS. 3 and 4, when manipulating handle 84 is rotated 60 degrees clockwise there is rotation of control shaft 112 which in turn rotates cover portion 110 which contains balls 114 and 116 on the continuation of control shaft 112. The rotation of balls 114 and 116 over balls 104 and 106 compresses balls 104 and 106 into recesses 92. Since balls 104 and 106 are fixed to valve shaft 100, valve shaft 100 is urged downward against the conical top member 72 of exhaust valve assembly 16, thereby closing exhaust valve assembly 16. When exhaust valve assembly 16 is closed, stem 64, positioned on main valve assembly 14, pushes the main valve assembly open a distance of value A as shown in FIG. 3, thereby allowing fluid communication between inlet port 20 and outlet port 22, at the same time spring 48 is compressed from its static position.

In FIG. 3, the positioning of balls 114 and 116 and balls 104 and 106 is shown when the main valve assembly 14 is in the open position, as previously described. Balls 114 and 116 are rotated such that their position is beyond the center point of balls 104 and 106. Balls 114 and 116 remain in that position since they are stopped by abutment pin 96. Abutment pin 96 and ball 104 form a capture space or locking slot which prevents ball 114 from rotating counterclockwise and closing the main valve assembly 14. The distance that balls 104 and 106 are compressed in recesses 92 is equal to the value A, or the distance main valve assembly 14 opens.

Referring now to the closed position as shown in FIG. 4, when manipulating handle 84 is rotated 60° counterclockwise, balls 114 and 116 roll over and then off balls 104 and 106 allowing balls 104 and 106 to return to their natural position since spring 48, which was compressed, now returns to its normal static position pushing up and closing main valve assembly 14 and urging upward stem 64 which opens exhaust valve assembly 16. Exhaust valve assembly 16 opens a value of A, as shown in FIG. 5, this allows fluid communication between outlet port 22 and exhaust port 24. Balls 114 and 116 will remain in this position since abutment pin 98 and ball 106 cooperatively form a capture space or locking slot for ball 116.

Numerous modifications and variations of the above disclosed invention are possible in light of the above teachings and, therefore, within the scope of the appended claims the invention may be practiced otherwise than as particularly described.

What is claimed is:

1. In an improved three-way valve including a pipe coupling housing having an inlet port, an outlet port and an exhaust port and having control and valve members formed therein and wherein there is disposed in said valve chamber a spring-loaded valve assembly for selective positioning thereof between a first position and a second position for fluid flow between said inlet port and said outlet port and between said outlet port and said exhaust port, respectively, and wherein the valve assembly is provided with a valve shaft for selective positioning of said valve assembly and wherein said valve shaft extends into said control chamber and wherein there is provided a manipulative handle including a control shaft and wherein said control shaft extends into said control chamber, an improved valve engagement assembly for said valve, which comprises:

first ball members disposed on a pin positioned on said valve shaft within said control chamber; and
second ball members disposed on a pin positioned on said control shaft within said control chamber and adjacent to said first ball members whereby rotation of said manipulative handle cause rotation of said control shaft causing said second ball members to contact said first ball members thereby exerting a downward force on such first ball members moving said valve shaft downwardly and correspondingly moving said valve assembly from said first position to said second position.

2. The improved three-way valve as defined in claim 1 wherein
said control shaft and said valve shaft are coaxially positioned.

3. The improved three-way valve as defined in claim 1 wherein
said first ball members comprise a ball disposed on diametrical portions of said pin extending through said valve shaft and said second ball members comprise a ball disposed on diametrical portions of said pin extending through opposite sides of said control shaft.

4. The improved three-way valve as defined in claim 1 wherein
said first ball members are positioned in recesses in a cap member disposed on said pipe coupling housing.

5. The improved three-way valve as defined in claim 1 and including abutment means in said control member restricting the rotation of said control shaft.

6. The improved three-way valve as defined in claim 5, wherein
said abutment means includes a first pin fixed in said cap member and parallelly disposed to said valve shaft and adjacent to one of said first ball members whereby rotation of said control shaft causes said second ball members to move over said first ball members to cause said first ball members to move coaxially downward within said recesses and to cause said valve shaft to move downwardly and thereby positioning one of said second ball members between said first pin and said adjacent first ball member to lock said first ball members within said recesses.

7. The improved three-way valve as defined in claim 5, wherein said abutment means includes a second pin fixed in said cap member and parallelly disposed to said valve shaft whereby
a counter rotation of said control shaft causes said second ball members to move over and away from said first ball members positioning one of said second ball members between said second pin and said first ball member thereby causing valve shaft to move upward.

8. The improved three-way valve as defined in claim 7, wherein
said second ball members are positioned such that the axis of said second ball members are in a plane below a plane extending tangentially of the uppermost surfaces of said first ball members in said recesses in said cap member.

9. The improved three-way valve as defined in claim 7, wherein
a not more than 60 degree turn of said manipulating handle in a counter-clockwise or clockwise direction causes said valve assembly to move from said first position or from said second position.

* * * * *